Oct. 10, 1933.                L. HAMILTON                1,930,126
                              BRAKE CONTROL
                          Filed July 22, 1932        2 Sheets-Sheet 1
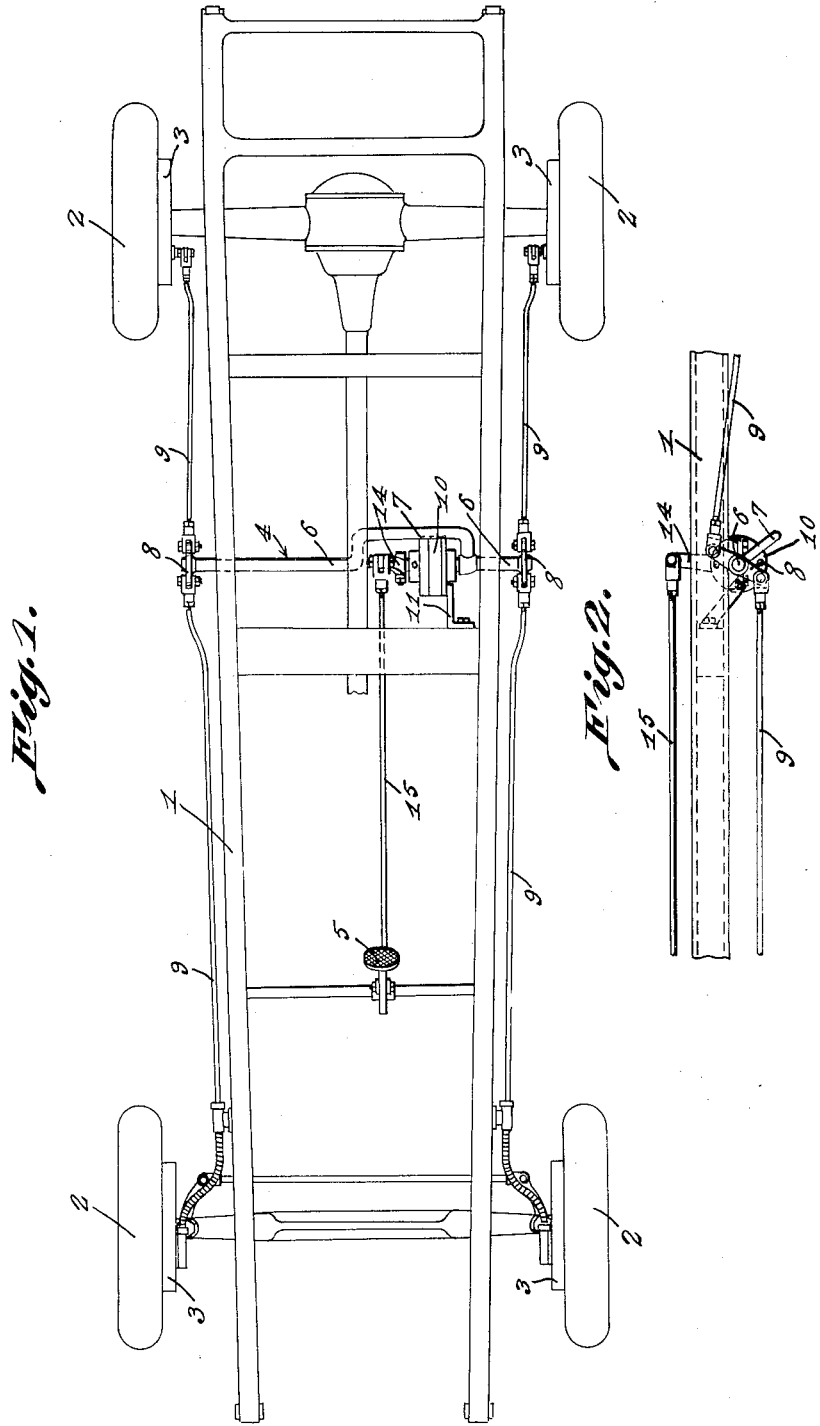
Leonard Hamilton, INVENTOR
BY Victor J. Evans & Co.
ATTORNEY Oct. 10, 1933.  L. HAMILTON  1,930,126
BRAKE CONTROL
Filed July 22, 1932  2 Sheets-Sheet 2
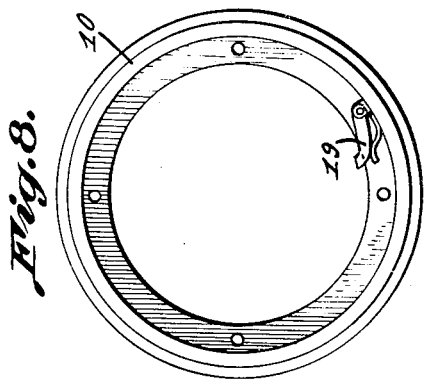
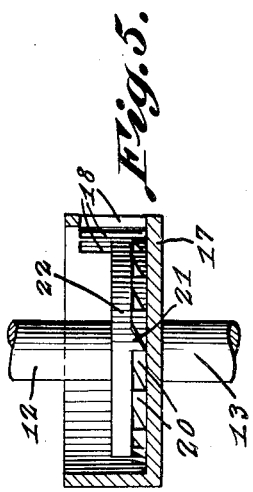
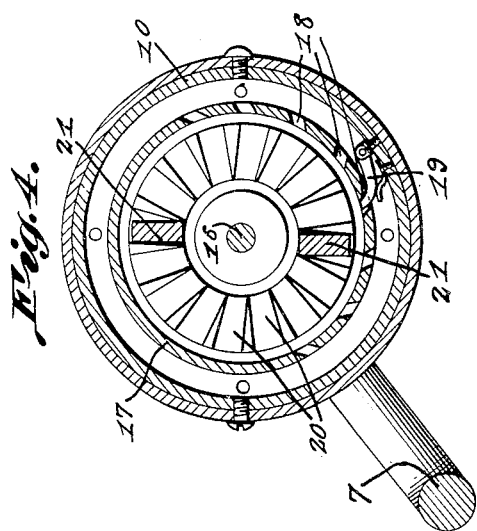
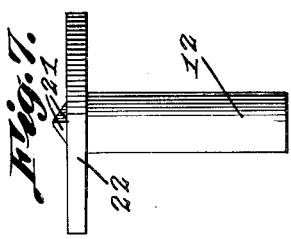
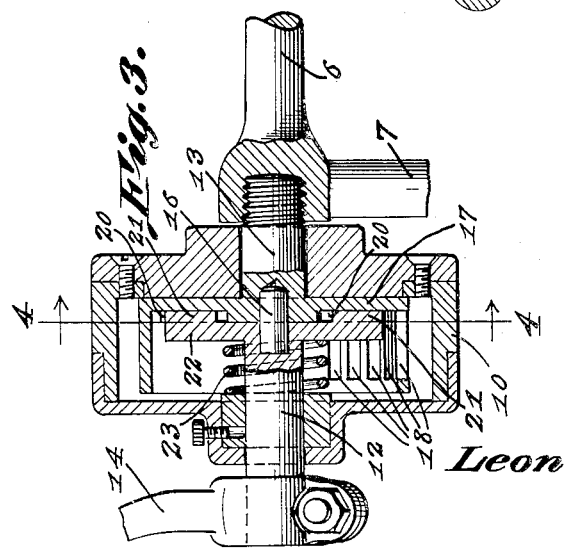
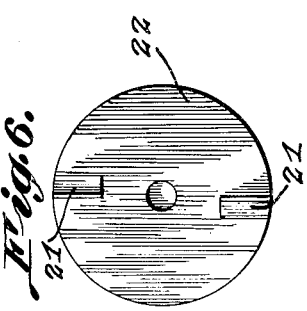
Leonard Hamilton, INVENTOR
BY Victor J. Evans & Co.
ATTORNEY Patented Oct. 10, 1933

1,930,126

UNITED STATES PATENT OFFICE 1,930,126

BRAKE CONTROL

Leonard Hamilton, Esserville, Va., assignor of one-half to Victor W. Warren, Norton, Va.

Application July 22, 1932. Serial No. 624,081

3 Claims. (Cl. 188—196)

This invention relates to brake controls for automobiles and like devices and has for the primary object, the provision of means for automatically adjusting the brake rigging and the operating medium thereof as wear occurs to the brake shoes or bands of the brakes to assure efficient operation of the brakes as long as any brake lining remains on the brake shoes or bands.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating an automobile chassis having a brake rigging and an operating medium therefor with a brake control applied thereto and constructed in accordance with my invention.

Figure 2 is a fragmentary side elevation illustrating a portion of the brake rigging of my invention.

Figure 3 is a fragmentary sectional view showing the brake control.

Figure 4 is a sectional view taken on the line 4—4 of Figure 3.

Figure 5 is a fragmentary sectional view showing the ratchet mechanism for the operating medium of the brake rigging.

Figure 6 is an end view illustrating one of the elements of the ratchet mechanism.

Figure 7 is a plan view illustrating the same.

Figure 8 is an end view showing the supporting housing and a spring pressed pivoted dog carried thereby.

Referring in detail to the drawings, the numeral 1 indicates the chassis of an automobile, the wheels 2 thereof being provided with brakes 3 of the conventional type operated by a brake rigging 4 through the actuation of a foot pedal or other operating medium 5. The brake rigging 4 includes a transversely arranged journalled shaft 6 provided with an offset portion 7 and has its ends equipped with levers 8 to which the brake rods 9 of the brakes are pivoted. The offset portion 7 is for the purpose of accommodating a casing 10 supported to the chassis by a bracket 11. The casing 10 is preferably constructed from three sections detachably connected and so constructed that they will provide leak-proof connections between themselves permitting lubricant to be retained within the casing. The sections are so arranged relative to each other that they form end and intermediate sections. The end sections rotatably support shafts 12 and 13. The shaft 12 has secured thereto an arm 14 to which a rod 15 of the operating medium 5 is pivoted. The other end of the shaft 13 is screw-threaded and threaded into a screw-threaded socket formed in one end of the offset portion 7 of the shaft 6 so as to arrange the shafts 12 and 13 in alignment with the shaft 6. The shaft 13 is threaded tightly to the shaft 6 so that the latter will be turned by the shaft 13 and the inner end of the latter is socketed to receive a dowel pin 16 fitting in a socket formed in the inner end of the shaft 13 whereby said shafts 12 and 13 are held in alignment and capable of rotation relative to each other.

A drum 17 is formed integrally with the inner end of the shaft 13 with the dowel pin 16 extending therethrough and has formed in its periphery a series of relatively spaced teeth 18 to be engaged by a spring pressed dog 19 pivoted to the casing 10 or the intermediate section thereof. One wall of the drum 17 has formed thereon a series of ratchet teeth 20 to be engaged by teeth 21 formed on a plate 22 which forms an integral part of the inner end of the shaft 12. A spring 23 is interposed between the casing 10 and the plate 22 about the shaft 12 to urge the shaft in an endwise direction to bring the teeth 21 into mesh with the teeth 20 of the drum, however, said spring will permit a slight endwise movement of the shaft 12 for the purpose of allowing the teeth 21 to ratchet over the teeth 20 during the movement of the shaft 12 in one direction.

The teeth 18 in the periphery of the drum are formed by slotting the drum at spaced intervals so that the pivoted dog 19 may move into and out of the various slots during the operation of the device and which will prevent the rotation of the drum 17 beyond a given amount in one direction.

The teeth 20 on the drum and the teeth 21 on the plate 22 of the shaft 12 form a ratchet means to the operating medium 5 for the purpose of permitting the operating medium when depressed or rocked upon its pivot to apply the brakes 3 and to return to its initial position during the releasing of the brakes. The teeth 18 of the drum are so spaced relative to each other that the drum will be permitted to rotate in opposite directions to permit the applying and releasing of the brakes through the medium 5. The dog 19 during the applying of the brakes moves out of its respective slot between a pair of teeth but fails to enter the next slot thereto until a certain amount of wear has taken place in the brakes and when such wear occurs the dog then enters the adjacent slot thereby automatically taking up on the brakes through the adjustment of the throw of the brake rigging. This adjustment affects the return of the operating arm 5 to its initial position and to permit the latter to return to its initial position so as to have its full throw, the ratchet mechanism between the shafts 12 and 13 operates or in other words the shaft 12 ratchets relative to the shaft 13 by the teeth 21 riding over the teeth 20 of the drum.

From the foregoing it is apparent that means is provided in the brake rigging between the brakes and the operating medium whereby the brake rigging will be adjusted automatically to compensate for the wear taking place in the brake shoes or bands of the brakes and also automatically permitting the operating medium 5 to always assume its initial position when manually released so that said operating medium will not lose any of its throw when the brake rigging is adjusted to take care of the wear in the brakes.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. In combination with brakes having a brake rigging including a shaft and an operating medium, a fixed casing located adjacent the shaft, a pair of shafts journalled in said casing and one of said latter named shafts secured to the first named shaft and the other shaft of said pair connected to the operating medium, a ratchet mechanism between the pairs of shafts, and a ratchet mechanism between one of the shafts of said pair and the casing.

2. A brake control comprising a fixed casing, a pair of shafts journalled in said casing and one of said shafts connected to a brake operating medium and the other shaft connected to a brake rigging shaft, a ratchet means between said pairs of shafts, and a ratchet means between the casing and one of the shafts of said pair.

3. A brake control comprising a fixed casing, a pair of shafts journalled in said casing, means connecting one of said shafts to the operating medium of a brake rigging, means connecting the other shaft to the brake rigging, a drum fixed to one of said shafts and having spaced slots forming spaced teeth, ratchet teeth on said drum, a plate fixed to the other shaft, ratchet teeth on said plate to engage the first named ratchet teeth, and a spring pressed pivoted dog carried by the casing to engage in the slots and between the teeth of the drum.

LEONARD HAMILTON.